United States Patent [19]

Wand et al.

[11] 4,121,550
[45] Oct. 24, 1978

[54] LIQUID-COOLED CYLINDER HEAD

[75] Inventors: Norbert Wand, Friedrichshafen; Wolfgang Rudert, Langenargen, both of Fed. Rep. of Germany

[73] Assignee: Motoren-und Turbinen-Union Friedrichshafen GmbH, Fed. Rep. of Germany

[21] Appl. No.: 597,489

[22] Filed: Jul. 21, 1975

[30] Foreign Application Priority Data

Aug. 7, 1974 [DE] Fed. Rep. of Germany ....... 2437965

[51] Int. Cl.² .................................................. F01P 1/06
[52] U.S. Cl. .............................. 123/41.31; 123/41.32; 123/41.82 R
[58] Field of Search ................ 123/41.31, 41.32, 41.82

[56] References Cited

U.S. PATENT DOCUMENTS

| | | | |
|---|---|---|---|
| 1,107,946 | 8/1914 | Hesselman | 123/41.82 |
| 1,891,638 | 12/1932 | Gadoux | 123/41.32 |
| 2,115,291 | 4/1938 | Spelts | 123/41.82 |
| 2,318,915 | 5/1943 | Anderson | 123/41.82 |
| 2,710,602 | 6/1955 | Maybach | 123/41.82 |
| 3,081,755 | 3/1963 | Kotlin | 123/41.82 |
| 3,086,505 | 4/1963 | Bovard | 123/41.82 |
| 3,159,148 | 12/1964 | Nallinger | 123/41.82 |
| 3,176,666 | 4/1965 | Whitehead | 123/41.82 |
| 3,315,652 | 4/1967 | Ries | 123/41.82 |
| 3,377,996 | 4/1968 | Kotlin | 123/41.82 |
| 3,420,215 | 1/1969 | Seifert | 123/41.82 |
| 3,491,731 | 1/1970 | Dinger | 123/41.82 |
| 3,769,948 | 11/1973 | Feichtinger | 123/41.82 |
| 3,818,878 | 6/1974 | Zaruba | 123/41.82 |

FOREIGN PATENT DOCUMENTS

| | | | |
|---|---|---|---|
| 1,195,689 | 5/1959 | France | 123/41.82 |
| 4,527,125 | 6/1967 | Japan | 123/41.32 |
| 1,236,242 | 6/1971 | United Kingdom | 123/41.82 |

*Primary Examiner*—Charles J. Myhre
*Assistant Examiner*—R. A. Nelli
*Attorney, Agent, or Firm*—Craig & Antonelli

[57] ABSTRACT

A liquid-cooled cylinder head for an internal combustion engine which is provided with inlet and exhaust channels disposed opposite one another in the cylinder head longitudinal direction, with a central chamber and with several inlet bores for the cooling liquid in the cylinder head bottom; two ring-shaped cooling channels are thereby provided surrounding the central chamber and disposed one above the other which are connected with each other by two overflow apertures disposed opposite one another in the cylinder head longitudinal direction so that the cooling liquid is forced to flow through the ring-shaped cooling channels one after the other in the circumferential direction in relation to the central chamber; two bores which are located opposite one another in the cylinder head cross direction in proximity of the cylinder head bottom thereby connect the lower ring-shaped channel with two cooling channels that are located along the longitudinal sides of the cylinder head and are fed by two inlet bores each.

18 Claims, 4 Drawing Figures

LIQUID-COOLED CYLINDER HEAD

The present invention relates to a liquid-cooled cylinder head for an internal combustion engine with inlet and exhaust channels disposed opposite one another in the cylinder head longitudinal direction, with a central chamber for the accommodation of an injection nozzle or of a pre-chamber and with several inlet bores for the cooling liquid in the cylinder head bottom which are arranged at the cylinder circumference.

It is the purpose of the liquid-cooling system to intensively cool in the cylinder head the places subjected to particularly high thermal loads and stresses, such as the cylinder head bottom within the area about the central chamber, the central chamber itself, the exhaust valve and the exhaust channel.

In a known liquid-cooled cylinder head, the shape of the cooling liquid space surrounding the central chamber effects a discharge of the cooling liquid predominantly in the axial direction of the cylinder with a low velocity so that the cylinder head bottom portion about the central chamber is not cooled to the desired extent. Also in this prior art cylinder head, notwithstanding the higher thermal load of the exhaust channel, the cooling channels are supplied to the same extent with cooling liquid within the area about the inlet and exhaust channels. Higher wall temperatures result therefrom within the area of the exhaust channel, which lead to undesired thermal stresses in the cylinder head.

The present invention is therefore concerned with the task to provide a liquid-cooled cylinder head, in which the aforementioned disadvantages and shortcomings are avoided.

The underlying problems are solved according to the present invention in that two ring-shaped cooling channels disposed one above the other and surrounding the central channel are provided which are connected with each other by two overflow apertures disposed opposite one another in the cylinder head longitudinal direction so that the cooling liquid is forced to flow seriatim through the annularly shaped cooling channels in the circumferential direction in relation to the central chamber, and in that two bores disposed mutually opposite one another in the cylinder head transverse direction in proximity to the cylinder head bottom connect the lower ring-shaped cooling channel with two cooling channels disposed along the longitudinal sides of the cylinder head and fed by two inlet bores each. These measures effect by reason of the forced high flow velocity of the cooling liquid an intensive cooling of the cylinder head bottom and of the central chamber.

In order to keep the wall temperatures of the inlet and exhaust channels at approximately the same level, a further channel is arranged according to the present invention for the area about the exhaust which surrounds the exhaust channel or channels on three sides thereof and which is connected by way of an inlet bore with the highest place of the cylinder crankcase for the simultaneous venting of the liquid spaces of the cylinder crankcase.

In order to assure a sufficient supply of the upper ring-shaped cooling channel with cooling liquid, the overflow aperture disposed in proximity of the cooling liquid return connection possesses according to a further feature of the present invention a smaller cross section than the the overflow aperture disposed opposite in the cylinder head longitudinal direction.

For purposes of venting the lateral cooling channels, one throttling insert each is arranged in the two connections between the further cooling channel and the lateral cooling channels, necessary for casting reasons, which enables the venting, yet precludes a significant overflow of the water at this location.

The advantages achieved with the present invention reside in particular in that an excellent cooling of the thermally highly stressed cylinder head areas is achieved by the conduction and guidance of the cooling liquid proposed by the present invention, and in that the thermal stresses which otherwise result due to uneven heat removal, are avoided.

These and other objects, features and advantages of the present invention will become more apparent from the following description when taken in connection with the accompanying drawing which shows, for purposes of illustration only, one embodiment in accordance with the present invention, and wherein.

Figure 4:
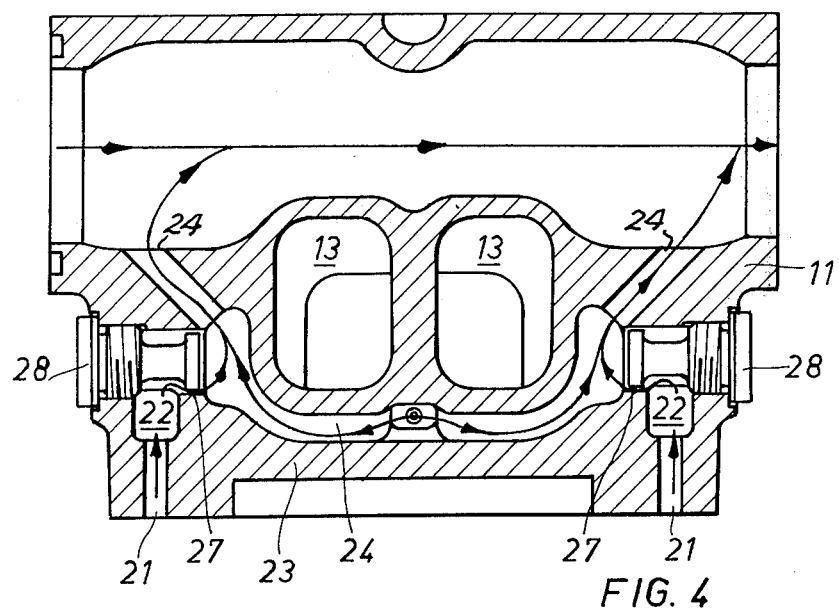
FIG. 4 is a cross-sectional view of the cylinder head taken along line IV—IV of FIG. 1.

Referring now to the drawing wherein like reference numerals are used throughout the various views to designate like parts, a liquid-cooled cylinder head 11 for an internal combustion engine (not shown in detail), includes inlet and exhaust channels 12 and 13 disposed opposite one another in the cylinder head longitudinal direction, a central chamber 14 for the accommodation of an injection nozzle or of a prechamber and several inlet bores 15 (FIG. 2), 21 (FIGS. 1 and 4) for the cooling liquid which are arranged in the cylinder head bottom 23 along the cylinder circumference.

An intensive cooling of the cylinder head bottom portion about the central chamber 14 is achieved by two annularly shaped cooling channels 16 and 17 (FGIS. 1, 2 and 3) disposed one above the other and surrounding the cooling chamber 14, which are connected with each other by two overflow apertures 18 and 19 (FIGS. 1 and 2) disposed mutually opposite in the cylinder head longitudinal direction. As a result thereof, the cooling liquid is forced to flow seriatim through the annularly-shaped cooling channels 16 and 17 in the circumferential direction in relation to the central chamber 14.

Figure 1:
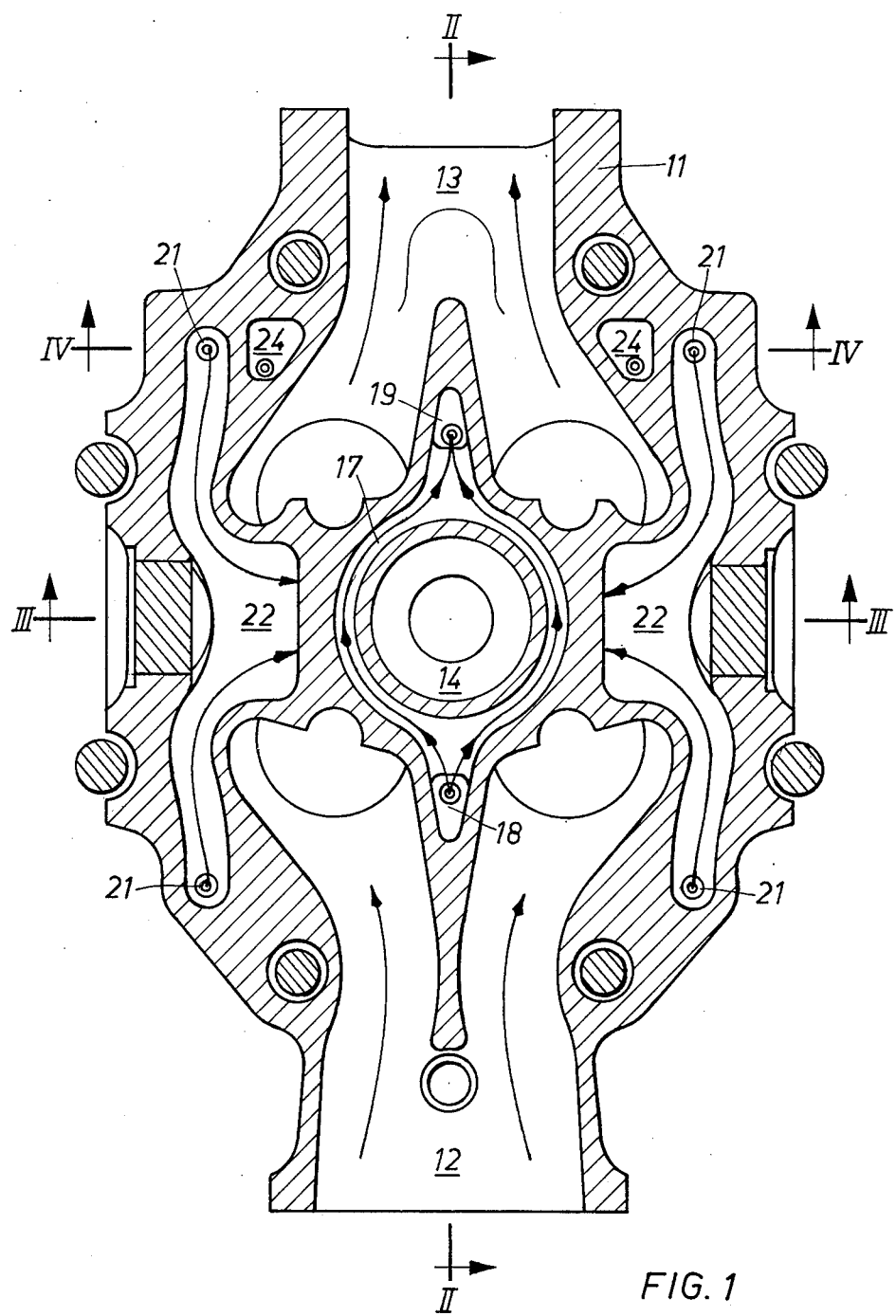
FIG. 1 is a cross-sectional view of a cylinder head in accordance with the present invention, parallel to its bottom and taken along line I—I in FIG. 2.
Figure 2:
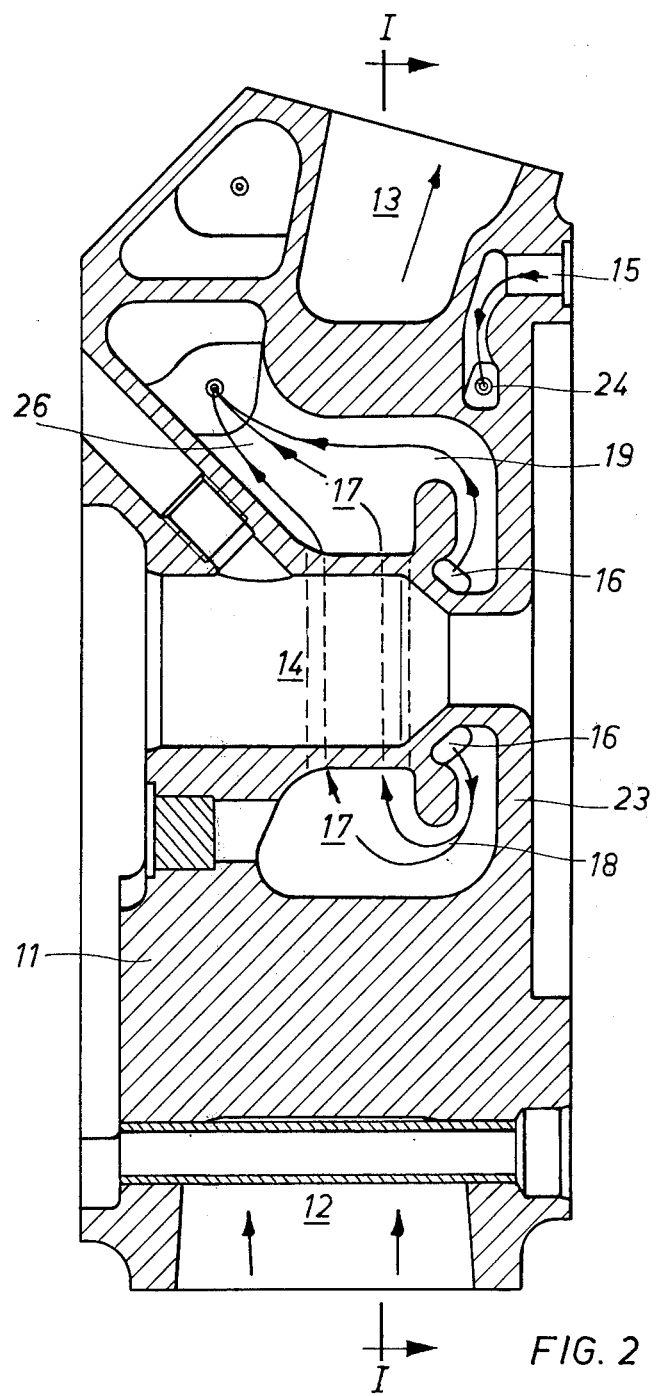
FIG. 2 is a longitudinal cross-sectional view of the cylinder head taken along line II—II in FIG. 1.
Figure 3:
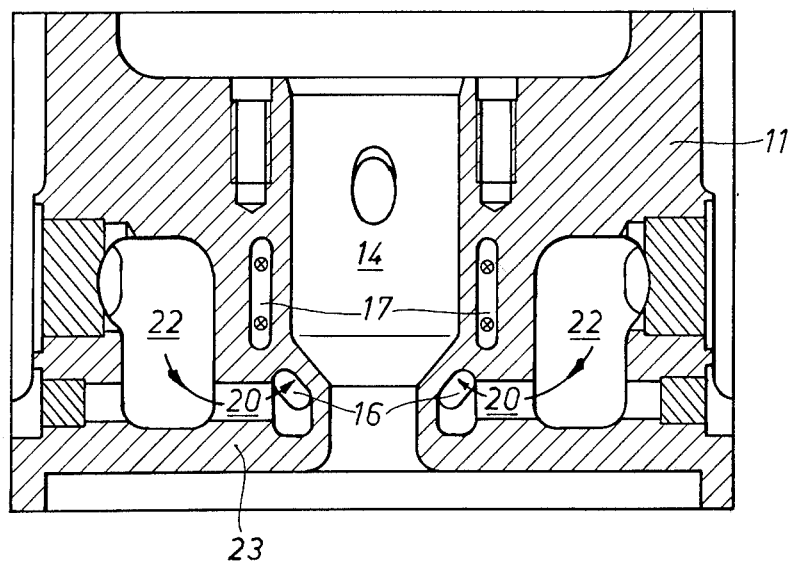
FIG. 3 is a transverse cross-sectional view of the cylinder head taken along line III—III in FIG. 1.

The lower ring-shaped cooling channel 16 is connected for purposes of its supply with cooling liquid by way of two bores 20 (FIG. 3) which are disposed opposite one another in the cylinder head transverse direction in proximity to the cylinder head bottom 23, with two cooling channels 22 (FIGS. 1 and 3) located along the longitudinal sides of the cylinder head and fed by way of two inlet bores 21 each (FIG. 1).

A preferred cooling of the exhaust channels 13 which are thermally more highly loaded compared to the inlet channels 12, is achieved by a further cooling channel 24 (FIGS. 1, 2 and 4) which surrounds the exhaust channel or channels 13 on three sides thereof. Approximately the same wall temperatures will be established thereby in the cylinder head 11, whence the otherwise unavoidable thermal stresses are avoided.

This further cooling channel 24 is fed with cooling liquid by way of an inlet bore 15 (FIG. 2) which in case of an internal combustion engine having a V-arrangement of the cylinders, is connected with the highest place of the cylinder crankcase for the simultaneous venting of the cooling liquid spaces of the cylinder crankcase.

In order to assure a sufficient feed or supply with cooling liquid of the upper ring-shaped cooling channel 17 by way of the overflow aperture 18, the overflow aperture 19 located in proximity of the cooling liquid return connection 26 (FIG. 2) has a smaller cross section than the overflow aperture 18 disposed opposite with respect thereto in the cylinder head longitudinal direction.

The venting of the two lateral cooling channels 22 of the cylinder head 11 takes place by way of the connections 27 (FIG. 4) between the further cooling channel 24 and the lateral cooling channels 22, which are necessary anyhow for casting reasons. In order to preclude a substantial liquid overflow at these places, one throttling insert 28 each is arranged thereat which leaves open only a narrow gap cross section for the passage of the air.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A liquid-cooled cylinder head for an internal combustion engine with inlet and exhaust channel means, a central chamber means and several inlet bore means for the cooling liquid in the cylinder head bottom which are arranged approximately at the cylinder circumference, characterized by two ring-shaped cooling channel means disposed one above the other and substantially surrounding the central chamber means, said two ring-shaped channel means being in communication with each other by way of two overflow aperture means, said two overflow aperture means being disposed completely above the lower of the two ring-shaped cooling channel means so that the cooling liquid is forced to flow through the ring-shaped cooling channel means one after the other in the circumferential direction with respect to the central chamber means, and bore means connecting the lower ring-shaped channel means with further cooling channel means located along the longitudinal sides of the cylinder head.

2. A liquid-cooled cylinder head according to claim 1, characterized in that the further cooling channel means located along the longitudinal sides of the cylinder head consist of two further cooling channel means which are each fed by two inlet bore means each.

3. A liquid-cooled cylinder head according to claim 2, characterized in that the inlet and exhaust channel means are disposed substantially opposite one another in the cylinder head longitudinal direction and in that the overflow aperture means are also disposed substantially opposite one another in the cylinder head longitudinal direction.

4. A liquid-cooled cylinder head according to claim 3, characterized in that two bore means which are disposed substantially opposite one another in the cylinder head transverse direction in proximity of the cylinder head bottom connect the lower ring-shaped cooling channel means with the cooling channel means located along the longitudinal sides of the cylinder head.

5. A liquid-cooled cylinder head according to claim 4, characterized in that the central chamber means serves for the accommodation of an injection nozzle.

6. A liquid-cooled cylinder head according to claim 4, characterized in that the central chamber means serves for the accommodation of a pre-chamber.

7. A liquid-cooled cylinder head according to claim 4, characterized by a still further cooling channel means which surrounds the exhaust channel means on approximately three sides.

8. A liquid-cooled cylinder head for an internal combustion engine with inlet and exhaust channel means, a central chamber means and several inlet bore means for the cooling liquid in the cylinder head bottom which are arranged approximately at the cylinder circumference, characterized by two ring-shaped cooling channel means disposed one above the other and substantially surrounding the central chamber means, said two ring-shaped channel means being in communication with each other by way of two overflow aperture means so that the cooling liquid is forced to flow through the ring-shaped cooling channel means one after the other in the circumferential direction with respect to the central chamber means, and bore means connecting the lower ring-shaped channel means with further cooling channel means located along the longitudinal sides of the cylinder head;

the further cooling channel means located along the longitudinal sides of the cylinder head consist of two further cooling channel means which are fed by two inlet bore means each;

the inlet and exhaust channel means are disposed substantially opposite one another in the cylinder head longitudinal direction and in that the overflow aperture means are also disposed substantially opposite one another in the cylinder head longitudinal direction;

two bore means which are disposed substantially opposite one another in the cylinder head transverse direction in proximity of the cylinder head bottom connect the lower ring-shaped cooling channel means with the cooling channel means located along the longitudinal sides of the cylinder head;

the central chamber means serves for the accommodation of an injection nozzle;

a still further cooling channel means which surrounds the exhaust channel means on approximately three sides;

characterized in that the still further cooling channel means is in communication by way of an inlet bore means with the highest location of the cylinder crankcase for the simultaneous venting of the cooling liquid spaces of the cylinder crankcase.

9. A liquid-cooled cylinder head with a return flow connection for one of the ring-shaped cooling channel means according to claim 8, characterized in that the overflow aperture means located in proximity of the cooling liquid return flow connection has a smaller cross section than the overflow aperture means disposed opposite thereto in the cylinder head longitudinal direction in order to assure a sufficient supply with cooling liquid of the upper ring-shaped cooling channel means.

10. A liquid-cooled cylinder head according to claim 9, characterized by one throttle insert means each in the two connections between the still further cooling channel means and the lateral cooling channel means, which enables the venting of the cooling liquid spaces of the cylinder head but prevents a significant liquid flow at this location.

11. A liquid-cooled cylinder head according to claim 1, characterized in that the inlet and exhaust channel means are disposed substantially opposite one another in the cylinder head longitudinal direction and in that the overflow aperture means are also disposed substantially opposite one another in the cylinder head longitudinal direction.

12. A liquid-cooled cylinder head according to claim 1, characterized in that two bore means which are disposed substantially opposite one another in the cylinder head transverse direction in proximity of the cylinder head bottom connect the lower ring-shaped cooling channel means with the cooling channel means located along the longitudinal sides of the cylinder head.

13. A liquid-cooled cylinder head according to claim 1, characterized by a still further cooling channel means which surrounds the exhaust channel means on approximately three sides.

14. A liquid-cooled cylinder head according to claim 13, characterized in that the still further cooling channel means is in communication by way of an inlet bore means with the highest location of the cylinder crankcase for the simultaneous venting of the cooling liquid spaces of the cylinder crankcase.

15. A liquid-cooled cylinder head with a return flow connection for one of the ring-shaped cooling channel means according to claim 1, characterized in that the overflow aperture means located in proximity of the cooling liquid return flow connection has a smaller cross section than the overflow aperture means disposed opposite thereto in the cylinder head longitudinal direction in order to assure a sufficient supply with cooling liquid of the upper ring-shaped cooling channel means.

16. A liquid-cooling cylinder head according to claim 13, characterized by one throttle insert means each in the two connections between the still further cooling channel means and the lateral cooling channel means, which enables the venting of the cooling liquid spaces of the cylinder head but prevents a significant liquid flow at this location.

17. A liquid-cooled cylinder head according to claim 16, characterized in that the still further cooling channel means is in communication by way of an inlet bore means with the highest location of the cylinder crankcase for the simultaneous venting of the cooling liquid spaces of the cylinder crankcase.

18. A liquid-cooled cylinder head for an internal combustion engine with inlet and exhaust channel means, a central chamber means and several inlet bore means for the cooling liquid in the cylinder head bottom which are arranged approximately at the cylinder circumference, characterized by:

two ring-shaped cooling channel means disposed one above the other and substantially surrounding the central chamber means, said two ring-shaped channel means being in communication with each other by way of two overflow aperture means so that the cooling liquid is forced to flow through the ring-shaped cooling channel means one after the other in the circumferential direction with respect to the central chamber means, bore means connecting the lower ring-shaped channel means with further cooling channel means located along the longitudinal sides of the cylinder head, and still further cooling channel means which surrounds the exhaust channel means on approximately three sides, said still further cooling channel means being in communication by way of an inlet bore means with the highest location of the cylinder crankcase for the simultaneous venting of the cooling liquid spaces of the cylinder crankcase.

* * * * *